(12) United States Patent
Tickoo et al.

(10) Patent No.: US 9,603,079 B2
(45) Date of Patent: Mar. 21, 2017

(54) ROUTING FOR MOBILE NODES

(75) Inventors: Omesh Tickoo, Portland, OR (US);
Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 13/993,346

(22) PCT Filed: Dec. 30, 2011

(86) PCT No.: PCT/US2011/068053
§ 371 (c)(1),
(2), (4) Date: Jun. 12, 2013

(87) PCT Pub. No.: WO2013/101166
PCT Pub. Date: Jul. 4, 2013

(65) Prior Publication Data
US 2014/0192715 A1    Jul. 10, 2014

(51) Int. Cl.
*H04W 40/00*   (2009.01)
*H04W 40/08*   (2009.01)
*H04W 40/18*   (2009.01)
*H04W 40/20*   (2009.01)
*H04W 40/14*   (2009.01)
*H04W 88/08*   (2009.01)

(52) U.S. Cl.
CPC ........... *H04W 40/00* (2013.01); *H04W 40/08* (2013.01); *H04W 40/14* (2013.01); *H04W 40/18* (2013.01); *H04W 40/20* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,280,483 B2 * | 10/2007 | Joshi | 370/238 |
| 7,719,987 B2 | 5/2010 | Kobayashi | |
| 8,335,164 B2 | 12/2012 | Liu | |
| 8,335,511 B2 * | 12/2012 | Singh | H04L 45/02 370/237 |
| 8,385,211 B2 | 2/2013 | Scarlatti | |
| 2006/0062175 A1 * | 3/2006 | Ling et al. | 370/328 |
| 2007/0195702 A1 * | 8/2007 | Yuen et al. | 370/238 |
| 2008/0291843 A1 | 11/2008 | Sonnenberg | |
| 2009/0092074 A1 * | 4/2009 | Jamalipour et al. | 370/316 |
| 2009/0285124 A1 * | 11/2009 | Aguirre | H04L 45/122 370/255 |
| 2011/0164546 A1 * | 7/2011 | Mishra et al. | 370/312 |

OTHER PUBLICATIONS

PCT International Search Report and Written Opinion issued in corresponding PCT/US2011/068053 dated Sep. 26, 2012 (13 pages).
Awerbuch, B., et al., "The Medium Time Metric: High Throughout Route Selection in Multi-rate Ad Hoc Wireless Networks," Mobile Networks and Applications, vol. 11, Issue 2, Apr. 2006 (14 pages).

* cited by examiner

*Primary Examiner* — Alex Skripnikov
(74) *Attorney, Agent, or Firm* — Trop Pruner & Hu, P.C.

(57) ABSTRACT

A route for establishing a wireless connection between a wireless device and a node may be selected based on an estimated duration of the route. The route duration may be estimated based on information related to the expected movement of nodes included in the route.

24 Claims, 4 Drawing Sheets

ROUTING FOR MOBILE NODES

BACKGROUND

This relates generally to wireless networks for mobile devices.

A mobile device can use wireless communication technology to establish a network connection. For example, the mobile device can establish a wireless connection to an access point in order to access a data network. In another example, the mobile device can establish a wireless connection to another mobile device in order to enable communication between the mobile devices.

BRIEF DESCRIPTION OF THE DRAWINGS

Some embodiments are described with respect to the following figures.

DETAILED DESCRIPTION

In accordance with some embodiments, a wireless connection between a mobile device and an access point may be established over a route based on an estimated duration of the route. As used herein, the term "route" refers to a specific set of nodes which may be used to establish a wireless connection. In one or more embodiments, a mobile device seeking a wireless connection can initiate a discovery of possible routes to the access point. For each route, a route report may be generated to collect data related to the duration of the route. The duration data may include speed, direction, planned path, and transmission range for each node of the route. As used herein, the term "planned path" refers to the expected movement of a device or vehicle in the physical world (e.g., a car travelling over a predefined series of roads to arrive at given location). The route report may also collect other data related to the route, such as the bandwidth and signal strength of each hop. The mobile device may then select a route based on the collected data to establish a wireless connection having a relatively long duration.

Figure 1:
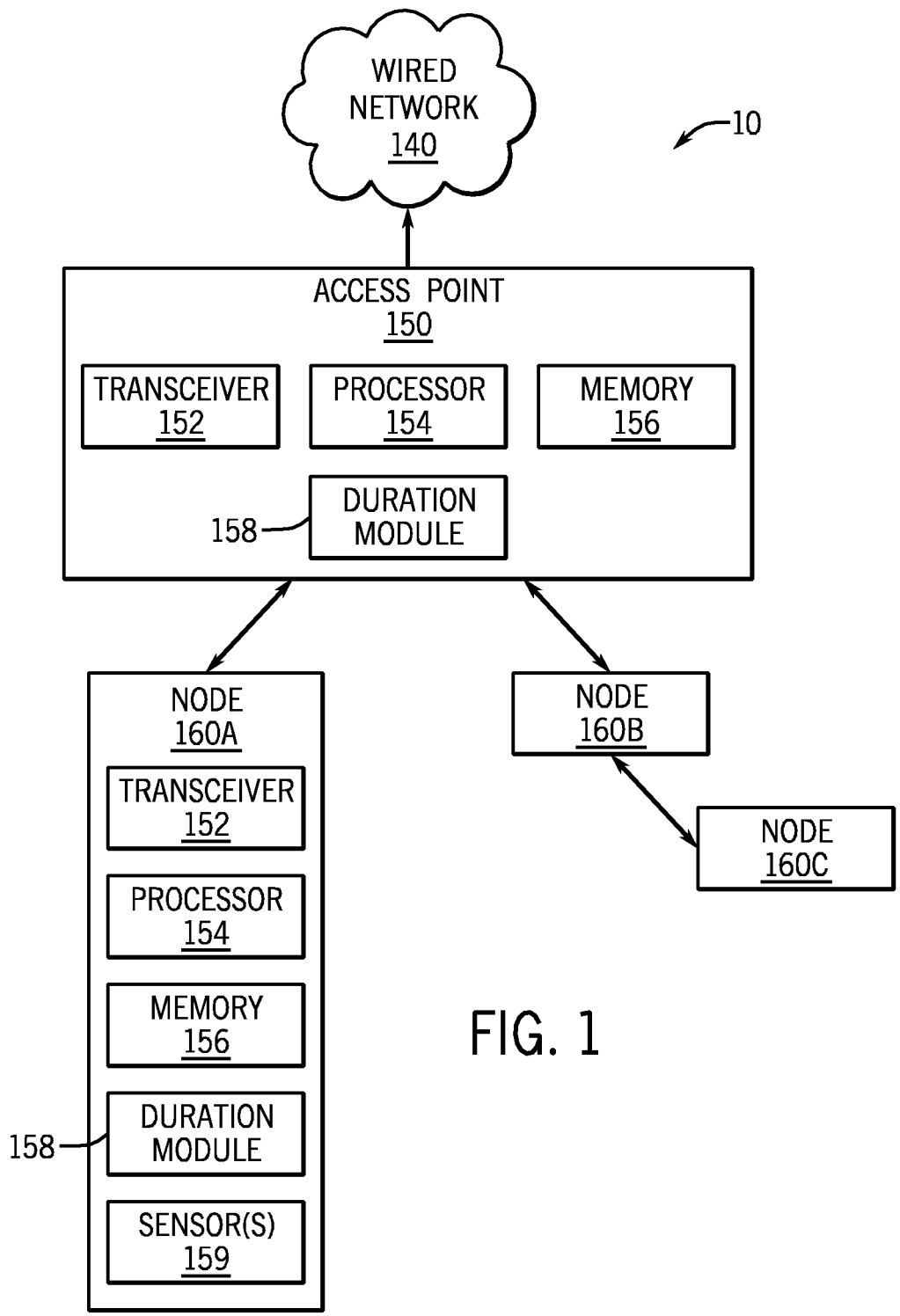
FIG. 1 is a depiction of a portion of a network in accordance with one embodiment of the present invention.

Referring to FIG. 1, a network configuration 10 may include a wired network 140, an access point 150, and nodes 160. The wired network 140 may be any communications network (e.g., a telephone network, a wide area network, the Internet, etc.).

In one or more embodiments, the nodes 160 may include any mobile devices configured to communicate via wireless communications technologies, such as a cellular telephone, a laptop computer or a handheld computer (e.g., a personal digital assistant) with a transceiver (i.e., a radio interface), etc. Further, the nodes 160 may also include any vehicles (e.g., cars, trucks, bicycles, boats, etc.) equipped with radio interfaces.

In one or more embodiments, the access point 150 provides a wireless interface to the wired network 140. Accordingly, the access point 150 may establish a wireless connection with a node 160, and thereby allow the connected node 160 to access the wired network 140. For example, the access point 150 may be a Wi-Fi hotspot, a wireless router, a cellular antenna, a base station, etc.

As shown in FIG. 1, in one or more embodiments, the node 160A and/or the access point 150 may include a transceiver 152, a processor 154, a memory device 156, and a duration module 158. Further, the node 160A may include sensor(s) 159. Note that, while not shown in FIG. 1 for the sake of simplicity, nodes 160B and 160C may also include the transceiver 152, processor 154, memory device 156, duration module 158, and sensor(s) 159. Further, each node 160 and/or access point 150 may have a transmission range, meaning a physical distance over which the included transceiver 152 can effectively send or receive radio transmissions to another device.

Generally, a node and an access point may establish a direct wireless connection if they are within transmission range of each other. For example, as shown in FIG. 1, nodes 160A and 160B are both within transmission range of the access point 150, and are thus both connected directly to the access point 150.

In one or more embodiments, a node may also establish a direct wireless connection with any other node that is within transmission range. For example, as shown in FIG. 1, nodes 160B and 160C are within transmission range of each other, and are thus connected directly to each other.

Further, in some embodiments, if a node is out of transmission range of a desired destination (e.g., an access point or another node), the node may instead connect to the destination through one or more intervening nodes. The intervening nodes may each act as a relay station or repeater, thus enabling the out-of-range node to connect to the access point indirectly. As used herein, each wireless connection in a route may be described as a "hop." For example, referring to FIG. 1, assume that node 160C is out of transmission range of access point 150. Thus, in this example, node 160C is connected to node 160B, which in turn is connected to access point 150. Accordingly, the connection from node 160C to access point 150 may be described as an "ad hoc" connection having two hops. As used herein, the node requesting an ad hoc connection may be referred to as a "source." Further, the requested target of the ad hoc connection (i.e., an access point or another node) may be referred to as a "destination."

The wireless connections used by the nodes 160 and/or access point 150 may be based on any radio communications technologies and/or standards. For example, such wireless connections may be Wi-Fi connections conforming to the IEEE (Institute of Electrical and Electronics Engineers) 802.11 standard, IEEE 802.11-2007, published Jun. 12, 2007.

In one or more embodiments, the duration module 158 may include functionality to identify one or more routes to connect a source to a destination. Further, in one or more embodiments, the duration module 158 may also include functionality to estimate a duration for each route (i.e., how long the route is expected to be available for a wireless connection) based on the expected movements of any nodes included in the route. Furthermore, in one or more embodiments, the duration module 158 may include functionality to select a particular route to establish the wireless connection based on the estimated duration of the route. The duration module 158 may be implemented in hardware, software, and/or firmware. In firmware and software embodiments it may be implemented by computer executed instructions stored in a non-transitory computer readable medium, such as an optical, semiconductor, or magnetic storage device.

In one or more embodiments, the sensor(s) 159 may be any device to collect information related to the node 160. The information may include movement information such as the speed, direction, and planned path of the node 160. The information may also include a transmission range for the node 160, a signal strength and/or quality for a hop, and a network load for a hop and/or the node 160. For example, the sensor(s) 159 may include a Global Positioning System (GPS) device, an onboard trip computer, a speedometer, a compass, a radio signal analysis device, a network bandwidth analysis device, or any other device or combination of devices.

Figure 2:
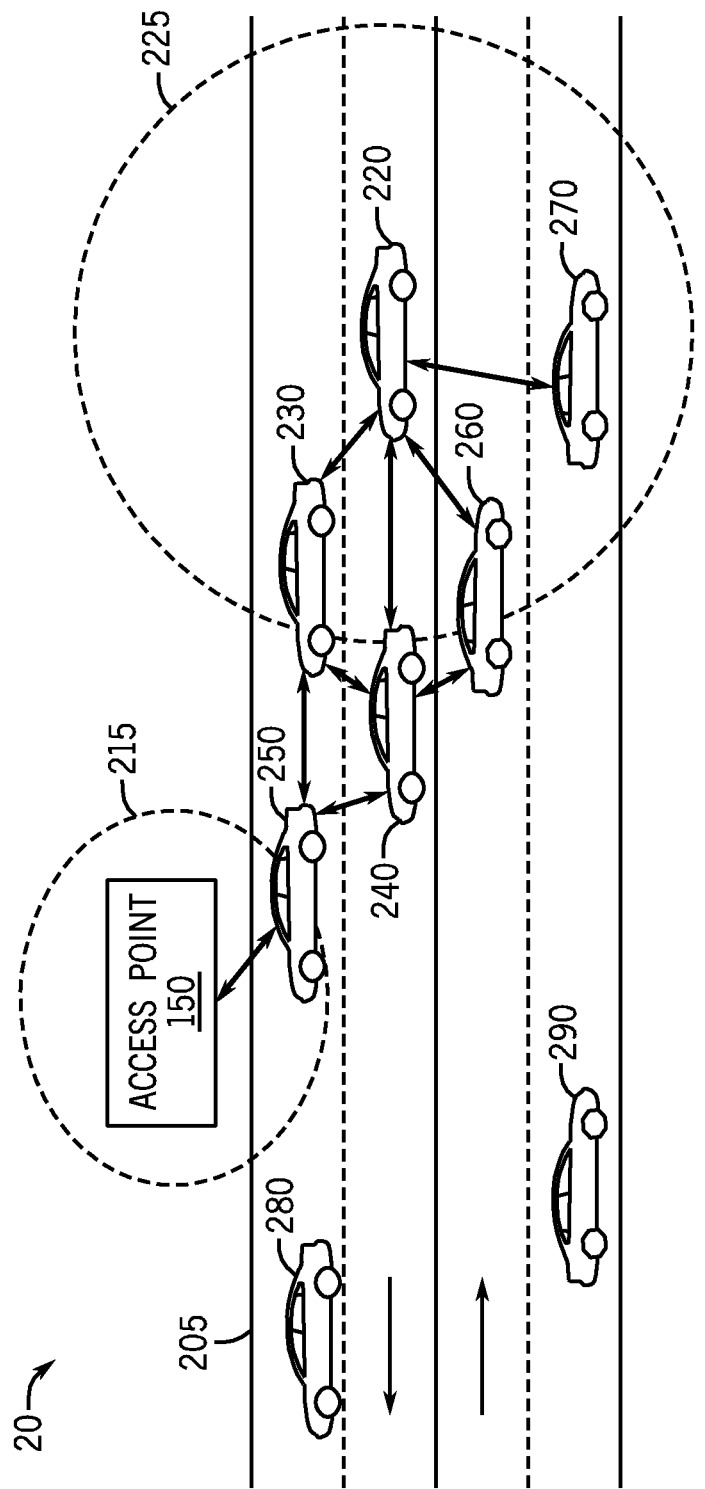
FIG. 2 is an example of network routing for mobile devices in accordance with one embodiment of the present invention.

Referring to FIG. 2, an example 20 of network routing is depicted in accordance with one or more embodiments. In this example, an access point 150 is located next to a highway 205. The access point 150 allows any nodes within a transmission range 215 to establish a wireless connection in order to access one or more wired networks (e.g., the Internet). Assume that the nodes shown in FIG. 2 (i.e., nodes 220, 230, 240, 250, 260, 270, 280, and 290) are equivalent to nodes 160 shown in FIG. 1, and include the same components and functionality described above with reference to nodes 160.

Assume that a source node 220 (e.g., a car equipped with an onboard computer and a WiFi transceiver) has a transmission range 225, and requires a connection to the access point 150. However, as shown in FIG. 2, the transmission range 215 of access point 150 does not overlap with the transmission range 225 of source node 220. Thus, source node 220 cannot form a direct connection with access point 150. Instead, source node 220 may establish an indirect connection using intervening nodes.

In the example shown in FIG. 2, source node 220 can potentially connect to access point 150 through four different routes. The first route includes, in order, node 230 and node 250. The second route includes node 230, node 240, and node 250. The third route includes node 240 and node 250. Finally, the fourth route includes node 260, node 240, and node 250.

In one or more embodiments, the source node 220 may initiate a discovery process to determine the potential routes to the access point 150. For example, in one or more embodiments, the source node 220 may broadcast a route discovery message (e.g., a packet or frame configured for route discovery). The route discovery message may be received by any nodes within transmission range. In one or more embodiments, each receiving node may update the route discovery message with information identifying itself as a node included in the route. Further, each receiving node may broadcast the updated route discovery message to the access point 150 and/or any other nodes. For example, a route discovery message arriving at access point 150 via the first route described above may include data identifying nodes 230 and 250 in order, thereby describing the particular route used by the received route discovery message.

In one or more embodiments, access point 150 may respond to each received route discovery message by initiating a process to estimate the duration of the corresponding route. In one or more embodiments, after the route discovery and duration estimation processes are completed, a particular route may be selected based on the estimated duration to establish a wireless connection between source node 220 and access point 150.

Note that the examples shown in FIGS. 1 and 2 are provided for the sake of illustration, and are not intended to limit embodiments of the invention. For example, embodiments of the invention may include any arrangement of node(s) and/or access point(s). Further, it is contemplated that wireless connections may be established over routes to any number of access points, and/or using any number of nodes. In another example, it is contemplated that an access point may be mobile. In yet another example, it is contemplated that wireless connections may be established between nodes only (i.e., without requiring any fixed access point).

Figure 3:
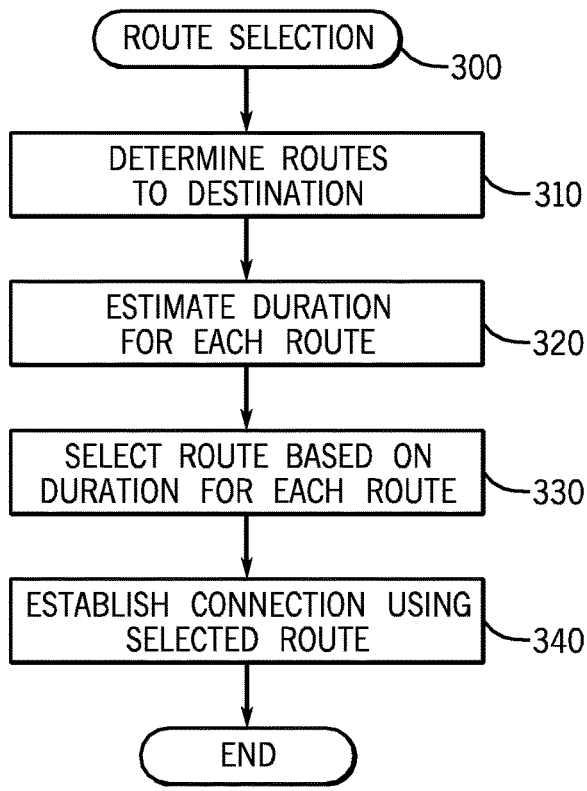
FIG. 3 is a flow chart in accordance with one embodiment of the present invention.

FIG. 3 shows a sequence 300 for route selection in accordance with one or more embodiments. The sequence 300 may be implemented in hardware, software, and/or firmware. In firmware and software embodiments it may be implemented by computer executed instructions stored in a non-transitory computer readable medium, such as an optical, semiconductor, or magnetic storage device. In one embodiment, the sequence 300 may be part of the duration module 158 shown in FIG. 1. In another embodiment, the sequence 300 may be implemented by any other component of a node and/or access point.

At step 310, the possible routes to a destination may be determined. For example, as described above with reference to FIG. 2, source node 220 may broadcast a route discovery message to any nodes within transmission range. The route discovery message may be received and forwarded by various combinations of nodes (or a single node). Thus, a separate copy of the route discovery message arrives at access point 150 by each available route. Further, in one or more embodiments, each received route discovery message includes information identifying the particular nodes along the route that it traveled.

At step 320, a duration (i.e., how long the route is expected to be available for a wireless connection) may be estimated for each route. In one or more embodiments, the duration for a route may be estimated by determining the amount of time that will elapse before at least one node physically moves out of the transmission range of a proximate node (i.e., an immediately preceding or following node within the route), thereby breaking a hop in the route. In one or more embodiments, this determination involves predicting the future movements of each node based on the current speed, direction, and planned path of the node. The predicted movements of the nodes may then be compared to the transmission ranges of neighboring nodes in order to estimate a point in time (if any) when the route becomes broken. The duration estimation process is described further below.

At step 330, a route may be selected for a wireless connection based on the estimated duration of the route. In one or more embodiments, the selected route is the route having the longest estimated duration based on the expected movement of the nodes. In this manner, the wireless connection established using the selected route may last as long as possible given the available routes. For example, referring to FIG. 2, source node 220 may compare the estimated durations of each available route to access point 150, and may select the route having the longest estimated duration.

At step 340, a wireless connection may be established using the selected route. For example, referring to FIG. 2, source node 220 may establish a wireless connection to access point 150 using the route selected at step 330 (i.e., the route having the longest estimated duration). After step 340, the sequence 300 ends.

Figure 4:
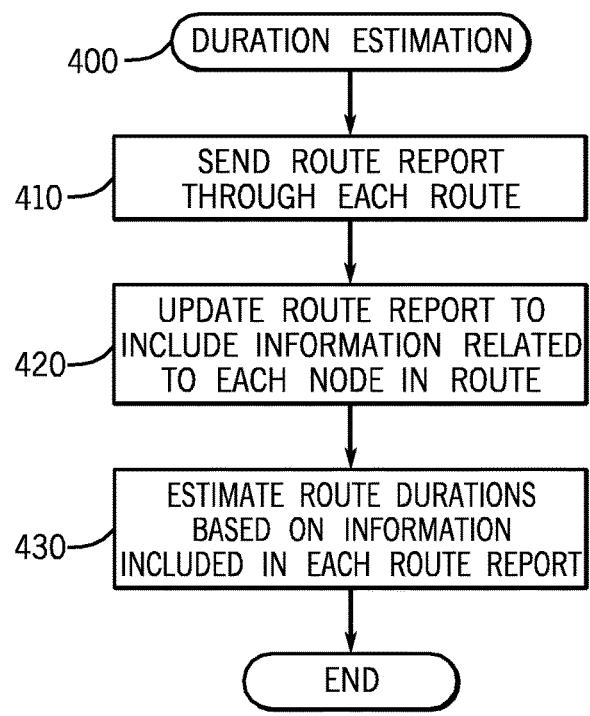
FIG. 4 is a flow chart in accordance with one embodiment of the present invention.

Referring to FIG. 4, a sequence 400 for duration estimation is depicted in accordance with one or more embodiments. The sequence 400 may be an expansion of step 320 shown in FIG. 3. The sequence 400 may be implemented in hardware, software, and/or firmware. In firmware and software embodiments it may be implemented by computer executed instructions stored in a non-transitory computer readable medium, such as an optical, semiconductor, or magnetic storage device. In one embodiment, the sequence 400 may be part of the duration module 158 shown in FIG. 1. In another embodiment, the sequence 400 may be implemented by any other component of a node and/or access point.

At step 410, a route report may be sent through each route. In one or more embodiments, a route report may be a message configured to collect information about the nodes of a route. For example, referring to FIG. 2, in response to receiving a route discovery message via the first route including node 230 and node 250, the access point 150 may send a route report message back through the first route (i.e., to node 230, node 250, and source node 220 in order).

At step 420, the route report may be updated at each node to include information related to each node included in the route. In one or more embodiments, such node information may include the speed, direction, and/or planned path of the node. For example, referring to FIG. 2, node 230 may receive a route report from access point 150, and may update the route report to include the speed, direction, and/or planned path of node 230. This information may be provided by sensor(s) (e.g., a Global Positioning System (GPS) device, an onboard trip computer, a speedometer, a compass, etc.) included in node 230.

In one or more embodiments, the route report may also be updated to include a transmission range for each node. For example, referring to FIG. 2, node 230 may update a route report to include a measurement of the transmission range of node 230. The transmission range may be a predefined value associated with the node (e.g., a fixed value specified for a given type of transceiver and/or signal type). Alternatively, the transmission range may be obtained by a sensor located in the node.

Further, in one or more embodiments, the route report may also be updated to include signal and network load characteristics of each node and/or hop. For example, node 230 may be configured to measure the signal strength and/or quality of the route. Further, node 230 may also be configured to measure network load (e.g., network bandwidth passing through the hop and/or the node 230). The node 230 may then update the route report to include the measurement of the signal strength and/or quality, and the measure of network load.

Optionally, in one or more embodiments, the route report may be updated at each node to include the speed of separation for the previous hop (i.e., the speed at which the current node is moving towards or away from the previous node). In one or more embodiments, the speed of separation may be obtained by measuring the strength of the signal received from the proximate node at two different points in time. For example, based on the increase or decrease in signal strength received from node 250 over a given unit of time, node 230 may estimate the change in distance to node 250.

At step 430, a duration may be estimated for each route. In one or more embodiments, the duration of a route may be estimated using the information included in a route report corresponding to the route. The estimated duration may be a quantitative measure (e.g., hours, minutes, etc.), a qualitative measure (e.g., high, medium, low), or some combination thereof.

In one or more embodiments, the estimated duration of each route may be based on the transmission ranges and expected movements of the nodes in the route. For example, referring to FIG. 2, source node 220 may receive a route report for the first route (i.e., the route having intervening nodes 230 and 250). The route report may include the transmission range, speed, direction, and/or planned path of node 230 and of node 250. In one or more embodiments, the source node 220 may estimate the duration for the first route using this information included in the route report.

In a first example of duration estimation, assume that node 230, node 250, and source node 220 are all travelling in the same direction (e.g., west) at sixty miles per hour (i.e., one mile per minute). Assume further that these three nodes will follow the same planned path for the next two miles, after which the planned path of node 230 will diverge from the planned path of node 250 and source node 220 (e.g., travel over road A then turn right on road B, etc.). Note that this divergence can be expected in two minutes (i.e., after travelling two miles at sixty miles per hour). Finally, assume that, based on the geometry of their diverging planned paths and their speeds, node 230 will exit the transmission ranges of both node 250 and source node 220 within thirty seconds after diverging. At this point in time, the link between node 250 and source node 220 will be broken, and the first route will no longer be available. Accordingly, in this example, the duration of this route may be estimated to be two minutes and thirty seconds.

In another example of duration estimation, assume that node 230, node 250, and source node 220 are all travelling in the same direction and have the same planned path, but node 250 is moving at a speed sixty miles per hour faster than that of node 230 and source node 220. Assume that node 250 will exit the transmission range of node 230 if the distance between the two nodes increases by one mile. Accordingly, because the relative speed between these two nodes (i.e., the speed of node 250 away from node 230) is one mile per minute, the duration of the route in this example may be estimated to be one minute. After step 430, the sequence 400 ends.

Referring again to step 330 in FIG. 3, it is contemplated that selecting a route may be based on considerations in addition to obtaining the longest possible duration for a wireless connection. In one or more embodiments, a route may be selected only if the estimated duration exceeds a predefined minimum time threshold (e.g., ten milliseconds, one second, one minute, etc.). For example, referring to FIG. 2, assume that node 280 seeks to establish an ad hoc connection with node 290. As shown, node 280 and node 290 are travelling in different directions, and thus the distance between the two nodes will continually increase. Assume further that the estimated duration of the ad hoc connection between node 280 and node 290 will be shorter than a predefined minimum time of connection. Thus, in this example, the requested ad hoc connection is not established because the estimated duration fails to meet the predefined minimum time of connection.

In one or more embodiments, the route selection may also be based on a number of hops and/or nodes in a route. For example, the source node 220 may use the information in a route report to determine the number of hops and/or nodes in a given route. The number of hops and/or nodes may be used, in combination with the estimated duration of each route, to select a route. For example, the source node 220 may only estimate durations for routes having fewer hops (or nodes) than a predefined maximum threshold. In another example, in the situation that two routes have similar estimated durations, the source node 220 may select the one of the two routes that includes fewer hops. In yet another example, the route may be selected based on combined scores giving proportional weights for the number of hops and for the estimated duration of each route (e.g., 40 percent weight for number of hops and 60 percent weight for estimation duration).

Further, in one or more embodiments, the route selection may also be based on signal characteristics of each node and/or hop. For example, referring to FIG. 2, the route report for the first route may include information related to the signal strength for the hop between access point 150 and node 250, for the hop between node 250 and node 230, and for the hop between node 230 and source node 220. The source node 220 may use the signal strength information included the route report to calculate a combined measure of the overall signal strength and/or quality for the route. The source node 220 may then use this information in selecting a route. For example, the source node 220 may only estimate durations for routes having an overall signal strength or quality that exceeds a predefined minimum threshold (e.g., a minimum required signal-to-noise ratio, a minimum quality of service metric, etc.), and may ignore any routes that fail to meet the same threshold. In another example, in the situation that two routes have similar estimated durations, the source node 220 may select the one of the two routes having the higher measure of signal strength and/or quality. In yet another example, the route may be selected based on combined scores giving proportional weights for the measure of signal strength and for the estimated duration of each route.

Furthermore, in one or more embodiments, the route selection may also be based on the network load through each hop and/or node. For example, referring to FIG. 2, the route report for the first route may include information related to the network load for each hop in the first route. The source node 220 may select a route based on combined scores giving proportional weights for load balancing across routes and for the estimated duration of each route. In another example, the source node 220 may not select the route having the longest estimated duration if selecting that route would cause a node and/or a hop included in the route to exceed a maximum bandwidth allocation.

In one or more embodiments, the route selection may also be based on a combined or aggregated score of any of the above-discussed (and/or any other) factors. For example, the source node 220 may select the route having the lowest aggregated score for the following formula: (relative speed of route)*(number of hops)/(route share factor). In this example, the relative speed of the route may be a measure of the speed of separation between the nodes of the route, and the route share factor may be a measure of the commonality of the planned paths of nodes.

In one or more embodiments, the route discovery process and duration estimation process may be performed in a single pass through a route. For example, the source node 220 may broadcast a routing packet to any nodes within transmission range. In one or more embodiments, the routing packet may be configured to perform the functions of both the route discovery message and the route report described above. Each node may update the routing packet with information related to the movement of the node. The node may then forward the routing packet to another node or to a destination. Upon receiving the routing packet, the destination (e.g., access point 150 or another node) may use the information to identify the available routes, and to estimate the duration of each route. The destination may then select the route based on the estimated durations of each route. In addition, the destination may also use any other information included in the routing packet (e.g., signal characteristics) to select a route.

Figure 5:
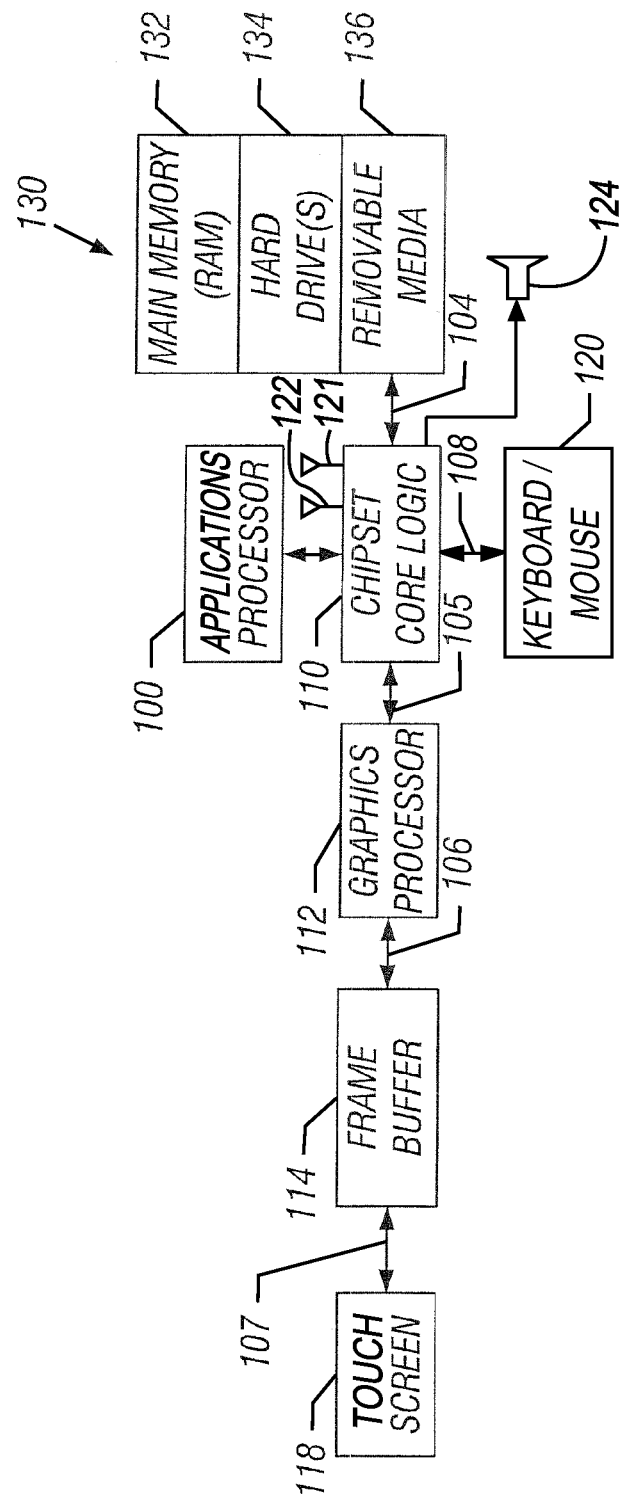
FIG. 5 is a schematic depiction of a mobile device and/or an access point in accordance with one embodiment of the present invention.

FIG. 5 depicts a computer system 130, which may be the access point 150 and/or the nodes 160 shown in FIG. 1. The computer system 130 may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112 via a bus 105, and the applications processor 100 in one embodiment. The graphics processor 112 may also be coupled by a bus 106 to a frame buffer 114. The frame buffer 114 may be coupled by a bus 107 to a display screen 118, such as a liquid crystal display (LCD) touch screen. In one embodiment, a graphics processor 112 may be a multi-threaded, multi-core parallel processor using single instruction multiple data (SIMD) architecture.

The chipset logic 110 may include a non-volatile memory port to couple the main memory 132. Also coupled to the logic 110 may be a radio transceiver and antenna(s) 121, 122. Speakers 124 may also be coupled through logic 110.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. For example, it is contemplated that the route discovery process and/or the duration estimation process may be performed at any location(s) in the network (e.g., at the client level, at the base station or access point level, at a network level, or any combination thereof). It is intended that the appended claims cover all such modifications and variations as fall within the true spirit and scope of this present invention.

What is claimed is:

1. A method for wireless communication comprising:
based on information about estimated durations of wireless routes between a mobile device and a node, establishing a proposed network routing;
determining whether the proposed network routing includes more than a predetermined number of hops;
enabling a computer processor to connect the mobile device and the node using the proposed network routing only if it has less than the predetermined number of hops.

2. The method of claim 1 wherein establishing a proposed network routing is also based on a speed and a direction of the mobile device.

3. The method of claim 1 wherein establishing a proposed network routing is also based on a speed and a direction of the node.

4. The method of claim 1 wherein establishing a proposed network routing is also based on a planned path of the node.

5. The method of claim 1 wherein establishing a proposed network routing is also based on a transmission range of the mobile device.

6. The method of claim 1 wherein establishing a proposed network routing is also based on a transmission range of the node.

7. The method of claim 1 wherein establishing a proposed network routing is also based on a signal strength of the node.

8. The method of claim 1 wherein establishing a proposed network routing is also based on a network load of the node.

9. The method of claim 1 wherein establishing a proposed network routing is also based on a speed of separation between the mobile device and the node.

10. The method of claim 1 wherein establishing a proposed network routing is also based on an estimated duration of the one of the wireless routes exceeding a predefined minimum time threshold.

11. The method of claim 1 further comprising, prior to connecting the mobile device and the node, sending a route discovery message from the mobile device to the node.

12. The method of claim 11 further comprising, prior to connecting the mobile device and the node:
receiving the route discovery message at the node; and
obtaining the information about the estimated duration of the proposed network routing using the route discovery message at the node.

13. The method of claim 11 further comprising, prior to connecting the mobile device and the node:
receiving the route discovery message at the node;
in response to receiving the route discovery message, sending a route report from the node to the mobile device; and
obtaining the information about the estimated durations of the wireless routes using the route report at the mobile device.

14. A non-transitory computer readable medium storing instructions to cause a computer to:
determine a wireless route including a mobile device, an intermediate node, and a destination node;
based on information about an estimated duration of the wireless route between the mobile device and the destination node, establishing a proposed network routing;
determining whether the proposed network routing includes more than a predetermined number of hops;
enabling a computer processor to connect the mobile device and the destination node using the proposed network routing only if it has less than the predetermined number of hops.

15. The medium of claim 14 further storing instructions to, establish the proposed network routing also based on speed and direction information for the mobile device and the intermediate node.

16. The medium of claim 14 further storing instructions to establish the proposed network routing also based on a planned path of the mobile device and a planned path of the intermediate node.

17. The medium of claim 14 further storing instructions to establish the proposed network routing also based on a transmission range for the mobile device and a transmission range for the intermediate node.

18. A mobile device comprising:
a wireless transceiver; and
a controller coupled to the wireless transceiver, the controller to:
based on an estimated duration of a wireless route to an access point, connect to the access point;
based on information about estimated durations of wireless routes between the mobile device and a node, establishing a proposed network routing;
determining whether the proposed network routing includes more than a predetermined number of hops; and
enabling a computer processor to connect the mobile device and the node using the proposed network routing only if it has less than the predetermined number of hops.

19. The mobile device of claim 18 wherein the controller is also to determine the estimated duration using a speed and a direction of the mobile device.

20. The mobile device of claim 18 wherein the controller is also to determine the estimated duration using a speed and a direction of an intermediate node included in the wireless route.

21. The mobile device of claim 18 wherein the controller is also to determine the estimated duration using a planned path of an intermediate node included in the wireless route.

22. The mobile device of claim 18 wherein the controller is also to determine the estimated duration using a transmission range of an intermediate node included in the wireless route.

23. The mobile device of claim 18 wherein the controller is also to determine a number of hops included in the wireless route.

24. The mobile device of claim 18 wherein the controller is also to determine a signal quality for a hop included in the wireless route.

* * * * *